United States Patent
Senba et al.

[11] Patent Number: 5,945,210
[45] Date of Patent: Aug. 31, 1999

[54] POROUS FILM AND PREPARATION PROCESS THEREOF

[75] Inventors: Katsumi Senba; Toshiyuki Ishii; Takayuki Kajihara; Tsutomu Iseki; Toshiyuki Enomoto, all of Aichi, Japan

[73] Assignee: Mitsui Chemicals, Inc., Tokyo, Japan

[21] Appl. No.: 08/760,318

[22] Filed: Dec. 4, 1996

[30] Foreign Application Priority Data

Dec. 13, 1995 [JP] Japan .................................... 7-324286

[51] Int. Cl.$^6$ ....................................................... B32B 5/22
[52] U.S. Cl. .................. 428/317.9; 264/41; 264/211; 264/288.8; 264/290.2; 264/567; 428/318.4; 524/313; 524/320; 524/423; 524/427
[58] Field of Search .............................. 428/308.4, 318.4, 428/317.9, 910; 264/41, 211, 556, 567, 210.7, 288.8, 290.2; 524/311, 312, 313, 425, 310, 320, 423, 427

[56] References Cited

U.S. PATENT DOCUMENTS

| | | | |
|---|---|---|---|
| 4,704,238 | 11/1987 | Okuyama et al. | 264/41 |
| 4,793,956 | 12/1988 | Nogiwa et al. | 264/41 |
| 4,794,128 | 12/1988 | Kawaguchi et al. | 521/138 |
| 5,126,391 | 6/1992 | Yamamoto et al. | 524/310 |
| 5,441,807 | 8/1995 | Brandt et al. | 428/349 |
| 5,594,070 | 1/1997 | Jacoby et al. | 525/88 |

FOREIGN PATENT DOCUMENTS

| | | |
|---|---|---|
| 0253667 | 1/1988 | European Pat. Off. . |
| 0459142 | 12/1991 | European Pat. Off. . |
| 62-18435 | 1/1987 | Japan . |
| 62-27438 | 2/1987 | Japan . |
| 62-32136 | 2/1987 | Japan . |
| 4-227738 | 8/1992 | Japan . |
| WO95/27516 | 10/1995 | WIPO . |

OTHER PUBLICATIONS

Database WPI, Section Ch, Week 8711, Derwent Publications Ltd., London, GB; Class A17, AN 87–075466, XP002035430 & JP 62 027438A (Mitsubishi Petrochemical Co., Ltd.), Feb. 5, 1987 *abstract*.

*Primary Examiner*—Paul Thibodeau
*Assistant Examiner*—D. Lawrence Tarazano
*Attorney, Agent, or Firm*—Burns, Doane, Swecker & Mathis, L.L.P.

[57] ABSTRACT

A porous film is here disclosed which is obtainable by stretching a film in at least uniaxial direction, said film being formed from a resin composition containing 25 to 70 parts by weight of a polyolefin resin and 75 to 30 parts by weight of an inorganic filler; said resin composition further containing 0.5 to 10 parts by weight of dehydrated castor oil (a) and 0.01 to 5 parts by weight of hardened castor oil (b) based on the total 100 parts by weight of the polyolefin resin and the inorganic filler; and the amount of the component (a) being 20 to 95% by weight based on the total amount of the components (a) and (b). In this porous film, softness and feeling like cloth, moisture vapor transmission, uniformity of the film thickness and the like are equal to their conventional levels. Furthermore, the adhesive strength of a securing tape does not deteriorate because the third components (a) and (b) do not float on the surface of the porous film. Therefore, it can be suitably used as materials of articles such as disposable diapers fixable and attachable by securing tapes.

12 Claims, No Drawings

POROUS FILM AND PREPARATION PROCESS THEREOF

BACKGROUND OF THE INVENTION (i) Field of the Invention

The present invention relates to a porous film and a preparation process thereof. More specifically, the present invention relates to a porous film in which moisture vapor transmission, feeling, uniformity of film thickness and the like are maintained equally to their conventional levels and adhesive properties are improved, and a preparation process thereof.

(ii) Description of the Prior Art

Heretofore, there have been proposed many methods in which each film comprising a polyolefin resin and an inorganic filler is stretched in uniaxial or biaxial directions to generate continuous voids in the film itself, thereby manufacturing porous films. The porous films have been used for many uses such as sanitary materials, medical materials, clothing materials, building materials and separators for cells and the like. However, any porous films having flexible feeling cannot be obtained by the blend system comprising the polyolefin resin and the inorganic filler alone, and hence the conventional porous films cannot be used in fields in which soft feeling like cloth, the flexible feeling and the like of films, are required. As a method which can solve such a problem, there has been proposed a method which comprises adding an additive such as a fatty acid ester as a third component to the blend system comprising the polyolefin resin and the inorganic filler.

For example, Japanese Patent Application Laid-open No. 18435/1987 has disclosed a method for preparing a breathable film which comprises stretching a film formed from a composition of 42 to 87% by volume of a polyolefin resin and 58 to 13% by volume of an inorganic filler in at least uniaxial direction, the composition being blended with an aliphatic alcohol-based fatty acid ester obtained from a fatty acid having 10 to 22 carbon atoms and an aliphatic alcohol having 1 to 12 carbon atoms in an amount of 3 to 25 parts by weight based on 100 parts by weight of the composition.

In this publication, it is described that examples of the fatty acid having 10 to 22 carbon atoms include lauric acid, myristic acid, palmitic acid, stearic acid, oleic acid, linolic acid, linolenic acid and ricinolic acid, and above all, ricinolic acid is most preferable. Furthermore, it is also described that examples of the aliphatic alcohol having 1 to 12 carbon atoms include methyl alcohol, ethyl alcohol, butyl alcohol, ethylene glycol, propylene glycol, glycerin, pentaerythritol and sorbitol, and above all, glycerin is most preferable. In an example of the publication, it is described that a purified castor oil containing 85% or more of glycerin triricinolate was used (hereinafter referred to simply as a purified castor oil).

Moreover, Japanese Patent Application Laid-open No. 227738/1992 has disclosed a stretched film containing a filler which comprises a resin composition consisting of (a) a linear low-density polyethylene copolymer having a density of 0.910 to 0.945 g/cm³ and a melt flow rate of 0.01 to 20 g/10 min, and containing 1 to 20% by weight of a comonomer of an α-olefin or a diolefin having 6 or more carbon atoms, and the copolymer having an extraction quantity (by boiling normal hexane) of 20% by weight or less, (b) a particulate inorganic filler having an average particle diameter of 10 μm or less and a bulk density of 0.1 to 0.7 g/cm³, (c) a saturated or an unsaturated fatty acid ester having 9 to 40 carbon atoms, the blend ratio of the component (c) being in the range of 0.1 to 15 parts by weight based on 100 parts by weight of 20 to 80% by weight of the component (a) and 80 to 20% by weight of the component (b), and a MD tensile strength of the film being 10 g or more.

It is also described in the publication that, as the component (c), the saturated fatty acid ester is preferably glyceryl hydroxystearate, more preferably glyceryl-12-hydroxystearate, and the unsaturated fatty acid ester is preferably glyceryl ricinolate. In examples of the publication, as the former ester, 2 to 3% by weight of a castor wax was used, and as the latter ester, 1 to 3% by weight of a purified castor oil was used.

According to investigation by the present inventors, with regard to a porous film obtained by using, as a third component, the purified castor oil described in Japanese Patent Application Laid-open No. 227738/1992, some facts have been elucidated. For example, when an adhesive tape having an adhesive layer such as a securing tape is stuck on the surface of this porous film via the adhesive layer, the purified castor oil migrates to the adhesive layer through the surface of the porous film with time, and as a result, the adhesive strength of the adhesive layer deteriorates, so that the securing tape is finally separated from the porous film. In addition, it has also been grasped that the above-mentioned phenomenon cannot be suppressed even in the case that the blend amount of the purified castor oil is 1 part by weight with respect to 100 parts by weight of the resin composition which is the lower limit of the use range of the castor oil described in examples of this publication.

Therefore, when the porous film prepared by the above-mentioned method is used as, for example, the back sheet of a disposable diaper to attach this disposable diaper to a human body, it is difficult to fix the diaper to the body by the securing tape or the like, which causes a problem that human urine leaks out.

Furthermore, with regard to the porous film obtained by using, as the third component, an ester such as the castor wax which is solid at room temperature, its adhesive strength scarcely deteriorates with time, but the obtained porous film is poor in softness.

Japanese Patent Application Laid-open No. 32136/1987 has disclosed a high filling composition comprising (a) 5 to 50% by weight of an ethylene-α-olefin copolymer having a melt index (MI) of 0.1 to 100 g/10 min and a density of 0.86 to 0.94 g/cm³, (b) 0.1 to 15% by weight of ester acids consisting of a polyhydric alcohol and a saturated and/or an unsaturated aliphatic monobasic acid having 2 to 24 carbon atoms and a hydroxy acid, and (c) 30 to 90% by weight of an inorganic filler. In the disclosed invention, however, the composition is used as a lining material of a carpet for a car or a tile carpet, and for the purpose of imparting a sound insulation effect to the carpet, the inorganic filler is added at a high concentration to increase the weight of the inorganic filler per unit area of the carpet. Therefore, the disclosed invention is quite different in a technical field from the porous film of the present invention which is useful for a use such as the disposable diaper having the problem of the adhesive strength deterioration of the securing tape or the like. In addition, there has not been described a mixing ratio of the plural ester acids comprising the polyhydric alcohol and the saturated and/or the unsaturated aliphatic monobasic acid having 2 to 24 carbon atoms and the hydroxy acid. Moreover, it has not been disclosed anywhere in the publication that the porous film having a suitable softness and excellent adhesive properties can be obtained by mixing these esters with a polyolefin resin in a specific ratio as in the present invention.

SUMMARY OF THE INVENTION

An object of the present invention is to provide a porous film in which softness and feeling like cloths, moisture vapor transmission, uniformity of the film thickness and the like are maintained equally to their conventional levels and there is no deterioration of adhesive properties due to the flotation of third components on the surface of the porous film, and a method for preparing the porous film.

The present inventors have intensively investigated, and as a result, it has been found that when dehydrated castor oil (a) and hardened castor oil (b) are used together within specific ranges, the above-mentioned object can be achieved, and in consequence, the present invention has been attained.

That is to say, the present invention is directed to a porous film obtainable by stretching a film in at least uniaxial direction, said film being formed from a resin composition containing 25 to 70 parts by weight of a polyolefin resin and 75 to 30 parts by weight of an inorganic filler; said resin composition further containing 0.5 to 10 parts by weight of dehydrated castor oil (a) and 0.01 to 5 parts by weight of hardened castor oil (b) based on the total 100 parts by weight of the polyolefin resin and the inorganic filler; and the amount of the component (a) being 20 to 95% by weight based on the total amount of the components (a) and (b); and a method for preparing the porous film.

The porous film which can be provided by the present invention has softness and feeling like cloth, moisture vapor transmission, uniformity of the film thickness and the like are equal to their conventional levels. In addition, the dehydrated castor oil (a) and the hardened castor oil (b) added as third components neither migrate nor float on the surface of the porous film, and therefore the adhesive strength and the like of the porous film do not deteriorate with time. Therefore, the porous films of the present invention can be suitably used as materials of articles such as disposable diapers, which are fixable and attachable by securing tapes or the like, in fields of sanitary materials, medical materials, clothing materials and the like. In addition, the porous films are suitable for uses in which they are laminated on other materials via an additive.

DESCRIPTION OF THE PREFERRED EMBODIMENTS

A porous film of the present invention can be prepared by, for example, melting and molding a resin composition comprising specific amounts of a polyolefin resin, an inorganic filler, a dehydrated castor oil (a) and a hardened castor oil (b) to form a film, and then stretching this film in at least uniaxial direction.

The polyolefin resin which can be used in the present invention, for example, include monoolefin polymers of ethylene, propylene, butene or the like, or copolymers thereof as a main component. Typical examples of the polyolefin resin include polyethylene resins such as low-density polyethylene, linear low-density polyethylene (ethylene-α-olefin copolymer), middle-density polyethylene and high-density polyethylene; polypropylene resins such as polypropylene and ethylene-polypropylene copolymer; poly (4-methylpentene); polybutene; ethylene-vinyl acetate copolymer; and mixtures thereof. These polyolefin resins may be obtained by the use of a Ziegler catalyst, or obtained by the use of a single site catalyst such as a metallocene catalyst. Above all, polyethylene resins are preferable, and linear low-density polyethylene (ethylene-α-olefin copolymer) and low-density polyethylene are most preferable. Furthermore, in view of the moldability, the stretchability and the like of the film, the melt index of the polyolefin resin is preferably in the range of about 0.5 to 5 g/10 min.

Examples of the inorganic filler include calcium carbonate, barium sulfate, calcium sulfate, barium carbonate, magnesium hydroxide, aluminum hydroxide, zinc oxide, magnesium oxide, titanium oxide, silica and talc. Above all, calcium carbonate and barium sulfate are preferable. The average particle diameter of the inorganic filler is preferably 20 $\mu$m or less, more preferably 10 $\mu$m or less, most preferably in the range of 0.5 to 5 $\mu$m. In order to improve the dispersibility of the inorganic filler in the polyolefin resin, the inorganic filler is preferably subjected to a surface treatment. A surface treatment agent having a function of covering the surfaces of the inorganic filler to render these surfaces hydrophobic, is preferably used. Examples of the surface treatment agent include higher fatty acids such as stearic acid and lauric acid, and metallic salts thereof.

A composition ratio between the polyolefin resin and the inorganic filler has an influence on the moldability and the stretchability of the film as well as the breathability and the moisture vapor transmission of the obtained film. If the amount of the inorganic filler is insufficient, adjacent voids, which can be obtained by the interfacial separation of the polyolefin resin and the inorganic filler from each other, are not continuous, so that the porous film having the good gas breathability and moisture vapor transmission cannot be obtained. On the contrary, if the amount of the inorganic filler is excessive, defective molding occurs during the film molding and the stretchability deteriorates, so that the sufficient stretching cannot be carried out. In view of these points, the composition ratio between the polyolefin resin and the inorganic filler is 25 to 70 parts by weight of the polyolefin resin with respect to 75 to 30 parts by weight of the inorganic filler, more preferably 30 to 60 parts by weight of the polyolefin resin with respect to 70 to 40 parts by weight of the inorganic filler.

The porous film of the present invention is characterized in that the resin composition containing the polyolefin resin and the inorganic filler, further contains specific amounts of both components of the dehydrated castor oil (a) and the hardened castor oil (b) as third components. The amounts of the components (a) and (b) to be added have an influence on the dispersibility of the inorganic filler in the polyolefin resin, the moldability, the uniformity of the film thickness, the stretchability and softness of the film, the adhesive strength to an adhesive tape, and the like.

If the amount of the dehydrated castor oil (a) is insufficient, the good dispersibility of the inorganic filler in the polyolefin resin cannot be obtained, and particularly in the case of a low stretch ratio, the uniformly stretching is difficult, so that uniform stretched film can scarcely be obtained and the uniformity of the film thickness also deteriorates. In addition, the obtained film is poor in the softness. On the contrary, if it is excessive, the extrusion moldability of the film deteriorates, so that the extrusion is unstable, with the result that a continuous productivity and the uniformity of the film thickness are liable to deteriorate, and the adhesive strength to an adhesive tape is also liable to deteriorate with time. In consideration of these points, the amount of the dehydrated castor oil (a) is in the range of 0.5 to 10 parts by weight based on the total 100 parts by weight of the polyolefin resin and the inorganic filler.

On the other hand, if the amount of the hardened castor oil (b) to be added is excessive, the softness of the obtained porous film is poor to form the hard film. Conversely, if it is insufficient, the good dispersibility of the inorganic filler in the polyolefin resin cannot be obtained, and particularly in the case of the low stretch ratio, uniform stretching is difficult, so that the uniformly stretched film can scarcely be obtained. In addition, the uniformity of the film thickness is liable to deteriorate. In consideration of these points, the amount of the hardened castor oil (b) is in the range of 0.01 to 5 parts by weight, more preferably 0.1 to 5 parts by weight, based on the total 100 parts by weight of the polyolefin resin and the inorganic filler.

A blend ratio between the dehydrated castor oil (a) and the hardened castor oil (b) has an influence on the softness of the obtained porous film, the adhesive strength to the adhesive tape, and the like. That is to say, if the ratio of the dehydrated castor oil (a) is too low, the softness of the obtained porous film is poor and results to form the hard film. Conversely, if it is too high, the adhesive strength tends to deteriorate. In view of this point, the amount of the component (a) is 20 to 95% by weight, preferably 30 to 95% by weight, based on the total amount of the components (a) and (b).

In the present invention, the dehydrated castor oil (a) is generally an ester of a fatty acid mixture and glycerin, the fatty acid mixture contains octadecadienoic acid as a main component in which a hydroxyl group and a hydrogen group are omitted from ricinoleic acid to generate further one double bond. The fatty acid mixture preferably contains not less than 30% by weight of 9,11-octadecadienoic acid and not less than 30% by weight of 9,12-octadecadienoic acid, and the total amount of the both acids is not less than 70% by weight.

For example, other fatty acids than octadecadienoic acid in the fatty acid mixture, are fatty acids having about 12 to 22 carbon atoms such as hexadecanoic acid, octadecanoic acid and octadecaenoic acid. The amount of the other fatty acids is preferably 30% by weight or less for preventing migration of the ester on the surface of the porous film so as not to deteriorate the adhesive strength.

Examples of the ester of a fatty acid mixture and glycerin, the fatty acid mixture contains octadecadienoic acid as a main component, include monoesters, diesters and triesters. Single substance or a mixture of these esters is acceptable. Esters containing triesters as a main component are preferably used.

The dehydrated castor oil (a) used in the present invention has been manufactured by subjecting a purified castor oil, which is a non-drying oil, to a chemical reaction to convert the same into the drying oil. Examples of the commercially available products include a dehydrated castor oil made by Ito Seiyu Co., Ltd as trade name DCO.

In the present invention, the hardened castor oil (b) is generally an ester of a fatty acid mixture and glycerin, the fatty acid mixture contains 12-hydroxyoctadecanoic acid obtained by hydrogenating a double bond of ricinoleic acid into a saturated fatty acid. The amount of 12-hydroxyoctadecanoic acid in the fatty acid mixture is preferably 70% by weight or more. For example, other fatty acids than 12-hydroxyoctadecanoic acid in the fatty acid mixture, are fatty acids having about 12 to 22 carbon atoms such as hexadecanoic acid and octadecanoic acid. The amount of the other fatty acids is preferably 30% by weight or less for preventing migration of the ester on the surface of the porous film so as not to deteriorate the adhesive strength.

Examples of the ester of a fatty acid mixture and glycerin, the fatty acid mixture contains 12-hydroxyoctadecanoic acid as a main component, include monoesters, diesters and triesters. Single substance or a mixture of these esters is acceptable. Esters containing triesters as a main component are preferably used.

The hardened castor oil (b) used in the present invention has been manufactured by hydrogenating a purified castor oil which is a non-drying oil. Examples of the commercially available products include a hardened castor oil made by Ito Seiyu Co., Ltd. as trade name Castor Wax.

The reason why the dehydrated castor oil (a) neither migrates nor floats on the surface of the porous film containing the polyolefin resin and the inorganic filler and therefore deterioration of adhesive strength of the film is prevented, has been concretely indefinite. However, it can be presumed that purified castor oil is non-drying oil but the dehydrated castor oil is drying oil, and in the film, the dehydrated castor oil absorbs oxygen in air to change into a solid, so that it less migrates to the surface of the film as compared with the purified castor oil which is the liquid non-drying oil.

Furthermore, the reason why the hardened castor oil (b) neither migrates nor floats on the surface of the porous film containing the polyolefin resin and the inorganic filler and therefore deterioration of adhesive strength of the film is prevented, has been concretely indefinite. However, it can be presumed that the hardened castor oil is solid at ordinary temperature, so that it less migrates to the surface of the film as compared with the purified castor oil which is liquid at ordinary temperature.

To the porous film of the present invention, some additives may be added, so long as they do not impair the object of the present invention, and examples of the additives include a stabilizer, an antioxidant, a colorant and an ultraviolet light absorber and the like.

Next, a method for preparing the porous film of the present invention will be described. For example, the polyolefin resin, the inorganic filler, the dehydrated castor oil (a), the hardened castor oil (b) and if necessary, other additives are mixed by the use of a Henschel mixer, a super mixer, a tumbler type mixer or the like, and kneaded and then pelletized by the use of a single screw extruder or a twin-screw extruder. Next, the pellets are melted and molded into a film at a temperature of a melting point or more of the polyolefin resin, preferably a temperature of from the melting point +20° C. to less than the resolving point of the resin by the use of a known molding machine such as an extruder equipped with a T-die or the like or an inflation molding machine equipped with a circular die. In a certain case, the mixture can directly be molded into the film without the pelletizing. The thus molded film can be stretched in at least uniaxial direction at a temperature of from room temperature to the softening point of the resin (a value measured by the procedure prescribed in JIS K-6760) in a known manner such as a roll method or a tenter method to bring about the interfacial separation of the polyolefin resin and the inorganic filler from each other, whereby a porous film can be prepared. The stretching may be carried out by one step or by several steps. A stretch ratio is concerned with film breakage at stretching as well as breathability and the moisture vapor transmission of the obtained film, and so the excessively high stretch ratio and the excessively low stretch ratio are not preferable. In view of this point, the stretch ratio is preferably in the range of 1.2 to 5 times, more preferably 1.2 to 4 times in at least uniaxial direction. In the case that biaxial stretching is carried out, there are a manner in which the first stretching is done in a machine direction or a direction at right angles thereto, and the second stretching is done in a direction at right angles thereto, and another manner in which the biaxial stretching is simultaneously done in the machine direction and the direction at right angles thereto. Either of these manners can be applied in the present invention. After the stretching, a heat setting treatment may be carried out in order to stabilize the shape of obtained voids, if necessary. The heat setting treatment is, for example, a heat setting treatment at a temperature of from the softening point of the resin to less than the melting point of the resin for a period of 0.1 to 100 seconds.

No particular restriction is put on the thickness of the porous film of the present invention, and it should be suitably decided so as to obtain the film which scarcely breaks and which has softness and good feeling like cloths. Usually, the thickness of the porous film is in the range of 5 to 100 $\mu$m, preferably 10 to 70 $\mu$m.

With regard to the thus prepared porous film of the present invention, its moisture vapor transmission is within the range of 1000 to 20000 g/m$^2$ 24 hr as measured in a manner prescribed in JIS-Z0208 (under conditions of 40° C., 90%, a CaCl$_2$ method).

Furthermore, even when the porous film of the present invention is kept or stored for a long period of time after its manufacture, the dehydrated castor oil (a) and the hardened castor oil (b) neither migrate nor float on the surface of the porous film. An adhesive strength with time (its measurement method will be described in detail in the undermentioned example) which is a parameter indicating the migration and the floatation of the components (a) and (b) is preferably at least 600 g/25 mm. When the porous film having an adhesive strength of at least 600 g/25 mm is used as, for example, the back sheet of a disposable diaper, the obtained diaper can be securely fixed by a securing tape or the like. In addition, no particular restriction is put on the upper limit of the adhesive strength, but according to the undermentioned measurement method, the breaking strength of the film is the upper limit.

The softness of the porous film of the present invention is 80 mm or less, and so it has a suitable softness. Therefore, the porous film can be suitably used for a use purpose requiring the softness, for example, as the back sheet of the disposable diaper. No particular restriction is put on the lower limit of the softness, but it is usually about 20 mm.

The porous film of the present invention having such properties has a suitable breathability, moisture vapor transmission and feeling as well as excellent mechanical properties and long-term adhesive properties. Therefore, the porous film of the present invention can be suitably used in the fields of sanitary materials such as disposable diapers, body fluid absorbing pads and bed sheets; medical materials such as surgical gowns and base materials for hot compress; clothing materials such as jumpers rainwear; building materials such as wallpapers and waterproof materials for roofs and house wraps; packaging materials for packaging desiccants, dehumidifying agents, deoxidizers, insecticides, disposable body warmers; packaging materials for keeping the freshness of various articles and foods; separators for cells; and the like. Because of having the excellent long-term adhesive properties, the porous film of the present invention is particularly desirable as materials of articles such as the disposable diapers and the body fluid absorbing pads which can be set and fixed by securing tapes (a pressure-sensitive adhesive tape). In addition, the porous film is also excellent in adhesive properties at the time of laminating with another material via an adhesive.

Next, the present invention will be described in more detail with reference to examples, but the scope of the present invention should not be limited to these examples. The values of melt indexes (MI), moisture vapor transmission, adhesive strength after a certain time, the uniformity of film thickness and softness in the examples are measured by the following methods.

(1) Melt index (g/10 min)

The melt index is measured under conditions of a temperature of 190° C. and a load of 2160 g in accordance with a procedure prescribed in ASTM D-1238-57T(E).

(2) Moisture vapor transmission (g/m$^2$.24 hr)

The moisture vapor transmission is measured at a temperature of 40° C. and a relative humidity of 90% in accordance with a procedure prescribed in JIS-Z0208 (CaCl$_2$ method).

(3) Adhesive strength (g/25 mm)

A polypropylene tape having a width of 25 mm (made by Toyo Chemical Co., Ltd., trade name Karalian PP, with an adhesive layer) is stuck on one surface of a porous film so that the machine direction of the film may be a peeling direction to prepare a sample. Next, this sample is allowed to stand in an oven at 60° C. for 48 hours, and the polypropylene tape is then peeled from the one surface of the porous film in accordance with a 180° peeling method prescribed in JIS-Z0237 by the use of a Tensilon tension tester (made by Toyo Baldwin Co., Ltd., trade name Tensilon). At this time, peel stress is measured.

(4) Uniformity of film thickness

Three samples [101 cm in a machine direction (a longitudinal direction) and 5 cm in a direction at right angles thereto (a transverse direction)] are prepared from a porous film, and the thickness of the samples is measured at 300 measuring points in all at an interval of 1 cm in the longitudinal direction by the use of a thickness measuring device (made by Peacock Co., Ltd., trade name Upright Dial Guage No. 25) to determine an average thickness (X), a maximum thickness (MAX) and a minimum thickness (MIN). Next, a value of [(MAX)−(MIN)]/(X) is calculated, and this value is regarded as the uniformity of the film thickness.

(5) Softness (mm)

The softness is measured in accordance with a method (a cantilever method) prescribed in JIS-L1096. A sample is prepared by winding a film having a width of 200 mm, a length of 300 mm and a thickness of 40 $\mu$m around a metallic measuring rule having a width of 25 mm, drawing the rule, and then pressing the resultant flat coil (width=25 mm, length=300 mm) by one reciprocation of a roller having a weight of 1 kg.

EXAMPLE 1

40 parts by weight of linear low-density polyethylene (made by Mitsui Petrochemical Industries, Co. Ltd., trade name Ultzex 2510F, density=0.925 g/cm$^3$, MI=1.3 g/10 min) were mixed with 60 parts by weight of calcium carbonate (made by Dowa Calfin Co., Ltd, trade name SST-40, average particle diameter=1.0 $\mu$m), 1.5 parts by weight of a dehydrated castor oil [made by Ito Seiyu Co., Ltd., trade name DCO; ester of a fatty acid mixture and glycerin, the fatty acid mixture contains 40 wt. % of 9,11-octadecadienoic acid, 41 wt. % of 9,12-octadecadienoic acid, 14 wt. % of octadecaenoic acid and 5 wt. % of the other fatty acids] and 1.5 parts by weight of a hardened castor oil [made by Ito Seiyu Co., Ltd., trade name Castor Wax; ester of a fatty acid mixture and glycerin, the fatty acid mixture contains 86 wt. % of 12-hydroxyoctadecanoic acid, 11 wt. % of octadecanoic acid and 3 wt. % of the other fatty acids] by a tumbler mixer, and the mixture was then uniformly kneaded and pelletized at 200° C. by the use of a tandem type extruder. The pellets were melted and molded into a film at 240° C. by the use of an extruder equipped with a T-die, and the film was then subjected to uniaxial stretching in a machine direction at a stretch ratio of 2.0 between a preheat roll heated to 70° C. and a stretching roll to obtain a porous film having a thickness of 40 $\mu$m. For the thus obtained porous film, adhesive strength after a certain time, moisture vapor transmission, the uniformity of film thickness and softness were measured by the above-mentioned methods, respectively. The obtained results are shown in Table 1.

EXAMPLES 2 to 7 AND 9 to 12, AND COMPARATIVE EXAMPLES 1 to 9

The same procedure as in Example 1 was repeated except that a blend ratio of the linear low-density polyethylene, calcium carbonate, dehydrated castor oil, hardened castor oil and other additives as well as a stretch ratio were changed as shown in Tables 1 and 2, thereby preparing porous films. Incidentally, in Example 7, barium sulfate (made by Barite Industries Co., Ltd., trade name HD, average particle diameter=0.95 $\mu$m) was used as an inorganic filler. The characteristics of the obtained porous films were evaluated in the same manner as in Example 1. The obtained results are shown in Tables 1 and 2.

EXAMPLE 8

The same procedure as in Example 1 was repeated except that low-density polyethylene (made by Mitsui Petrochemical Industries, Co. Ltd., trade name Mirason F312, density= 0.925 g/cm$^3$, MI=1.2 g/10 min) was used, thereby preparing a porous film. The characteristics of the obtained porous film were evaluated in the same manner as in Example 1. The obtained results are shown in Table 1.

TABLE 1

| | Blend Ratio (parts by weight) | | | | | Stretch ratio (times) | Adhesive Strength (g/25 mm) | Moisture Vapor Transmission (g/m$^2$ · 24 hr) | Uniformity of Thickness | Softness (mm) |
|---|---|---|---|---|---|---|---|---|---|---|
| | PE[1] | Inorganics[2] | Dehydrated Castor Oil | Hardened Castor Oil | Other[3] | | | | | |
| Ex. 1 | 40 | 60 | 1.5 | 1.5 | — | 2 | 720 | 8300 | 0.05 | 73 |
| Ex. 2 | 40 | 60 | 9.0 | 1.0 | — | 2 | 620 | 7300 | 0.09 | 62 |
| Ex. 3 | 40 | 60 | 1.5 | 1.5 | — | 4 | 700 | 11600 | 0.04 | 77 |
| Ex. 4 | 30 | 70 | 1.5 | 1.5 | — | 2 | 670 | 15500 | 0.07 | 70 |
| Ex. 5 | 70 | 30 | 1.5 | 1.5 | — | 2 | 770 | 1700 | 0.04 | 72 |
| Ex. 6 | 40 | 60 | 0.5 | 0.5 | — | 2 | 800 | 8800 | 0.10 | 80 |
| Ex. 7 | 40 | 60 | 1.5 | 1.5 | — | 2 | 720 | 6700 | 0.05 | 74 |
| Ex. 8 | 40 | 60 | 1.5 | 1.5 | — | 2 | 700 | 7700 | 0.05 | 70 |
| Ex. 9 | 40 | 60 | 5.0 | 1.5 | — | 2 | 660 | 7700 | 0.06 | 65 |
| Ex. 10 | 40 | 60 | 1.5 | 2.0 | — | 2 | 720 | 8500 | 0.05 | 77 |
| Ex. 11 | 40 | 60 | 3.0 | 0.2 | — | 2 | 690 | 8200 | 0.05 | 61 |
| Ex. 12 | 40 | 60 | 5.0 | 5.0 | — | 2 | 660 | 7800 | 0.08 | 70 |

Notes:
PE[1]: Linear low-density polyethylene (only in Example 8, low-densitypolyethylene)
Inorganics[2]: Calcium carbonate (only in Example 7, barium sulfate)
Other[3]: A = Purified castor oil; B = Hardened coconut oil

TABLE 2

| | Blend Ratio (parts by weight) | | | | | Stretch ratio (times) | Adhesive Strength (g/25 mm) | Moisture Vapor Transmission (g/m$^2$ · 24 hr) | Uniformity of Thickness | Softness (mm) |
|---|---|---|---|---|---|---|---|---|---|---|
| | PE[1] | Inorganics[2] | Dehydrated Castor Oil | Hardened Castor Oil | Other[3] | | | | | |
| Comp. Ex. 1 | 40 | 60 | — | — | A 1.0 | 2 | 300 | 8300 | 0.05 | 68 |
| Comp. Ex. 2 | 40 | 60 | — | — | — | 2 | 800 | 8700 | 0.22 | 94 |
| Comp. Ex. 3 | 40 | 60 | — | 1.0 | A 1.0 | 2 | 350 | 8500 | 0.05 | 78 |
| Comp. Ex. 4 | 40 | 60 | 1.0 | — | A 1.0 | 2 | 300 | 8400 | 0.07 | 65 |
| Comp. Ex. 5 | 40 | 60 | 12.0 | 1.5 | — | 2 | 550 | 6800 | 0.14 | 58 |
| Comp. Ex. 6 | 40 | 60 | — | — | B 1.0 | 2 | 450 | 8800 | 0.20 | 88 |
| Comp. Ex. 7 | 40 | 60 | 5.0 | — | — | 2 | 580 | 8100 | 0.11 | 62 |
| Comp. Ex. 8 | 40 | 60 | — | 3.0 | — | 2 | 800 | 9000 | 0.05 | 85 |

TABLE 2-continued

| | Blend Ratio (parts by weight) | | | | Stretch ratio (times) | Adhesive Strength (g/25 mm) | Moisture Vapor Transmission (g/m² · 24 hr) | Uniformity of Thickness | Softness (mm) |
|---|---|---|---|---|---|---|---|---|---|
| | PE[1] | Inorganics[2] | Dehydrated Castor Oil | Hardened Castor Oil | Other[3] | | | | |
| Comp. Ex. 9 | 40 | 60 | 1.0 | 5.0 | — | 2 | 730 | 8800 | 0.09 | 87 |

Notes:
PE[1]: Linear low-density polyethylene (only in Example 8, low-densitypolyethylene)
Inorganics[2]: Calcium carbonate (only in Example 7, barium sulfate)
Other[3]: A Purified castor oil; B = Hardened coconut oil

What is claimed is:

1. A porous film obtained by stretching a film in at least uniaxial direction, said film being formed from a resin composition containing 25 to 70 parts by weight of a polyolefin resin and 75 to 30 parts by weight of an inorganic filler;
   said resin composition further containing 0.5 to 10 parts by weight of an ester (a) of a fatty acid mixture and glycerin, said fatty acid mixture containing not less than 30% by weight of 9,11-octadecadienoic acid and not less than 30% by weight of 9,12-octadecadienoic acid, and the total amount of both acids being not less than 70% by weight, and 0.01 to 5 parts by weight of an ester (b) of a fatty acid mixture and glycerin, said fatty acid mixture containing not less than 70% by weight of 12-hydroxyoctadecadienoic acid based on the total 100 parts by weight of the polyolefin resin and the inorganic filler; and
   the amount of the ester (a) being 20 to 95% by weight based on the total amount of the esters (a) and (b).

2. The porous film according to claim 1 wherein the polyolefin resin is at least one resin selected from the group consisting of linear low-density polyethylene and low-density polyethylene.

3. The porous film according to claim 1 wherein the inorganic filler is at least one compound selected from the group consisting of calcium carbonate and barium sulfate.

4. The porous film according to claim 1 wherein the stretch ratio is in the range of 1.2 to 5 times.

5. The porous film according to claim 1 wherein the moisture vapor transmission of the porous film is in the range of 1000 to 20000 g/m²·24 hr.

6. The porous film according to claim 1 wherein the adhesive strength of the porous film is at least 600 g/25 mm, and the softness of the porous film is 80 mm or less.

7. A method for preparing a porous film which comprises the step of stretching a film in at least uniaxial direction, said film being formed from a resin composition containing 25 to 70 parts by weight of a polyolefin resin and 75 to 30 parts by weight of an inorganic filler;
   said resin composition further containing 0.5 to 10 parts by weight of an ester (a) of a fatty acid mixture and glycerin, said fatty acid mixture containing not less than 30% by weight of 9,11-octadecadienoic acid and not less than 30% by weight of 9,12-octadecadienoic acid, and the total amount of both acids being not less than 70% by weight, and 0.01 to 5 parts by weight of an ester (b) of a fatty acid mixture and glycerin, said fatty acid mixture containing not less than 70% by weight of 12-hydroxyoctadecadienoic acid, based on the total 100 parts by weight of the polyolefin resin and the inorganic filler; and
   the amount of the ester (a) being 20 to 95% by weight based on the total amount of the esters (a) and (b).

8. The method for preparing a porous film according to claim 7 wherein the polyolefin resin is at least one resin selected from the group consisting of linear low-density polyethylene and low-density polyethylene.

9. The method for preparing a porous film according to claim 7 wherein the inorganic filler is at least one compound selected from the group consisting of calcium carbonate and barium sulfate.

10. The method for preparing a porous film according to claim 7 wherein the stretch ratio is in the range of 1.2 to 5 times.

11. The method for preparing a porous film according to claim 7 wherein the moisture vapor transmission of the porous film is in the range of 1000 to 20000 g/m²·24 hr.

12. The method for preparing a porous film according to claim 7 wherein the adhesive strength of the porous film is at least 600 g/25 mm, and the softness of the porous film is 80 mm or less.

* * * * *